25602

Jan. 1, 1963        L. J. LYONS        3,070,876

RACE CAR WHEEL CHANGING MACHINE

Filed Dec. 6, 1961        7 Sheets-Sheet 1

Leo J. Lyons
INVENTOR.

BY *Clarence A. O'Brien
and Harvey B. Jacobson*
Attorneys

Jan. 1, 1963 L. J. LYONS 3,070,876
RACE CAR WHEEL CHANGING MACHINE
Filed Dec. 6, 1961 7 Sheets-Sheet 4

Leo J. Lyons
INVENTOR.

Jan. 1, 1963   L. J. LYONS   3,070,876
RACE CAR WHEEL CHANGING MACHINE
Filed Dec. 6, 1961   7 Sheets-Sheet 5

Leo J. Lyons
INVENTOR.

BY *Elmore A. O'Brien*
*and Harvey B. Jacobson*
Attorneys 3,070,876
RACE CAR WHEEL CHANGING MACHINE
Leo J. Lyons, 2526 Lincoln Drive, San Bernardino, Calif.
Filed Dec. 6, 1961, Ser. No. 157,461
15 Claims. (Cl. 29—240)

This invention relates to a novel and useful race car wheel changing machine and more specifically to a machine upon which a race car may be driven when making a pit stop for changing tires that is provided with means for automatically jacking up the race car upon proper positioning of the race car on the wheel changing machine and with means for suporting four new wheels alongside the raised race car, releasably engaging and supporting the four wheels on the race car to be changed, removing the four wheel nuts retaining the four wheels which are to be removed, withdrawing the four wheels which are to be replaced laterally and outwardly of the race car, moving the withdrawn wheels to one side while simultaneously moving the new wheels into position in axial alignment with the hubs on which they are to be secured, laterally moving the four new wheels into engagement with their respective hubs, replacing the wheel or hub nut on each hub, effecting release of the race car back onto the wheels and the lowering of the race car wheel changing machine whereby the race car may then be driven off and back into the race.

The sport of automobile racing is increasing in popularity and classes of race cars to be raced against each other are currently set up to very evenly match various makes of automobiles. Accordingly, while driver skill is very important and quite often a deciding factor in an automobile race, if the skill of several drivers is approximately equal when they are driving cars which are matched evenly in speed and handling ability, one slight mistake of any one driver or a slight malfunction of his machine may cause him to lose a race. As automobile races of any lengthy duration can require that the tires of the automobiles in the race be changed several times due to the high rate of speed the automobiles are travelling, time spent in the pits in changing race car wheels and tires results in considerable length of time. If the time spent in changing tires of race cars during a race could be appreciably reduced, each driver having a car whose wheels could be rapidly changed with a considerable savings in time would have a considerable advantage over the other drivers.

Accordingly, it is the main object of this invention to provide a race car wheel changing machine which will be capable of rapidly and simultaneously changing all four wheels of a race car.

A further object of this invention, in accordance with the immediately preceding object, is to provide a race car wheel changing machine whose operation will be completely automatic thus enabling pit crews for each car having the wheel changing machine of the instant invention at its disposal to be engaged in other activities in repairing and/or refueling a race car each time it makes a pit stop for changing tires.

A still further object of this invention, in accordance with the preceding objects, is to provide a race car wheel changing machine including lift means which may be utilized to raise and lower a race car and to actuate the wheel changing mechanism of the machine once the race car has been raised.

Another object of this invention is to provide a race car wheel changing machine in accordance with the preceding objects with means for properly positioning a race car relative to the machine and its lift means whereby a driver of a race car may merely drive his race car onto the positioning means of the wheel changing machine and thereafter have all four wheels of the race car changed automatically.

A final object of this invention to be specifically enumerated herein is to provide a race car wheel changing machine in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings the numeral 10 generally designates a conventional type of race car which includes a body generally referred to by the reference numeral 12 and four wheels 14. With attention directed to FIGURE 4 of the drawings it may be seen that each of the wheels 14 is secured to a threaded spindle 16 of the corresponding hub (not shown) of the race car 10 by means of a threaded wing nut 18 including three radially outwardly and equally circumferentially spaced wings 20.

The race car wheel changing machine of the instant invention is generally designated by the reference numeral 22 and includes a positioning pad or stand generally referred to by the reference numeral 24. As can best be seen from FIGURES 1 and 2 of the drawings, the race car stand 24 includes ramp portions 26 and 28 by which the race car 10 may be driven onto the stand 24. In addition, it will be noted that the stand 24 includes a pair of opposite side longitudinally extending portions or sections 30 and 32 and a center section 34. It is to be understood that any convenient means may be utilized for securing the sections 30 and 32 in laterally spaced relation relative to each other so as to adjust the stand 24 for race cars of different widths. Each of the sections 30 and 32 includes a portion which is disposed in overlapping engagement with a corresponding portion of the center section 34. Suitable fastening means (not shown) may be utilized to secure the sections 30, 32 and 34 in adjusted positions relative to each other.

The center section 34 is provided with a lifting table generally referred to by the reference numeral 36 and four extensible motors 38 are provided and have their upper ends passed through openings 40 formed in the center section 34 and secured to the lifting table 36. It will be noted that the extensible motors 38 are secured to the four corners of the lifting table 36. The lifting table 36 is adapted to engage the under portion of the body 12 of the race car 10 in order to lift the body portion 12 upwardly in order to raise the wheels 14 from engagement with the stand 24.

The machine 22 includes four elongated main frames each generally referred to by the reference numeral 42 which each extend along the corresponding end portion of one side of the stand 24. Each of the main frames 42 is substantially C-shaped in cross-section and includes a pair of arms 44 and 46 which are interconnected by means of a bight portion 48, see FIGURE 4. The free ends of the arms 44 and 46 of each main frame 42 has a generally U-shaped channel member 50 secured thereto by means of fasteners 52. It will be noted that the channel members 50 of each main frame 42 open toward each other.

Each of the main frames 42 has a pair of wheel handling members generally referred to by the reference numerals 54 and 56 slidably mounted between the corresponding channel members 50 for reciprocatory movement longitudinally of the corresponding main frame 42.

Figures 13, 14:
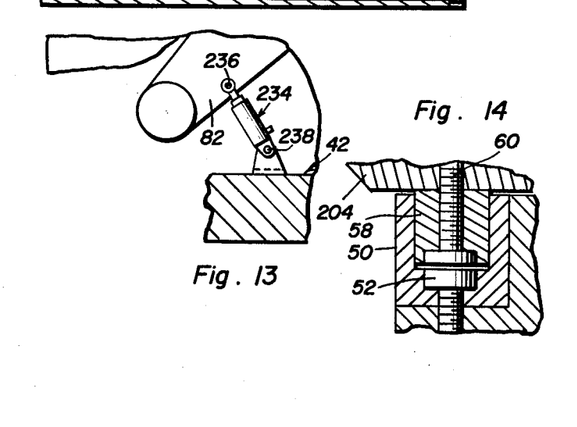
FIGURE 13 is a fragmentary vertical sectional view taken substantially upon the plane indicated by the section line 13—13 of FIGURE 12.
FIGURE 14 is an enlarged fragmentary transverse vertical sectional view showing the manner in which each of the wheel handling members is mounted for reciprocal movement along each main frame of the wheel changing machine.

With attention directed to FIGURE 14 of the drawings it will be noted that a guide rib 58 is secured along the top and bottom edges of each wheel handling member 54 and 56 by means of fasteners 60 and that each of the ribs 58 is snugly received within the corresponding channel member 50. It is to be noted that each of the channel members 50 has a laterally opening slot 62 formed therein, see FIGURES 4 and 5 and accordingly that each of the wheel handling members 54 and 56 may be moved laterally of the corresponding main frame 42 when that wheel handling member is disposed in alignment with the notches 62 which define a release station.

Figure 6:
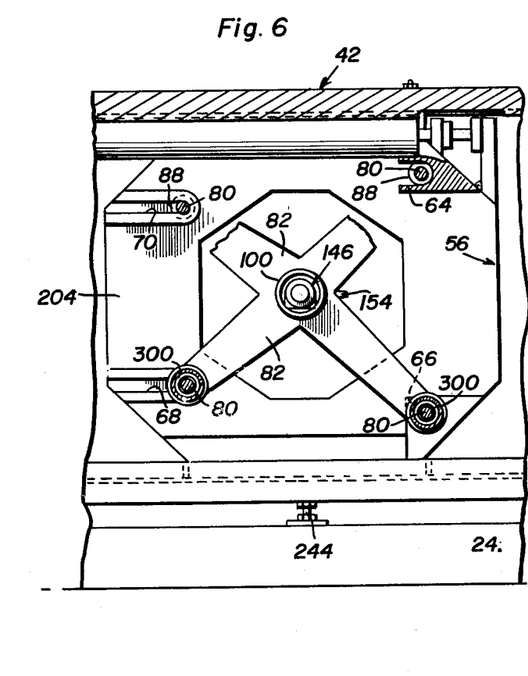
FIGURE 6 is a fragmentary longitudinal vertical sectional view on somewhat of a reduced scale taken substantially upon the plane indicated by the section line 6—6 of FIGURE 4 and with parts of the machine being broken away and shown in section.

From FIGURE 6 of the drawings it will be noted that the back of each wheel handling member 54 and 56 is provided with means defining four keyway slots 64, 66, 68 and 70.

Figure 4:
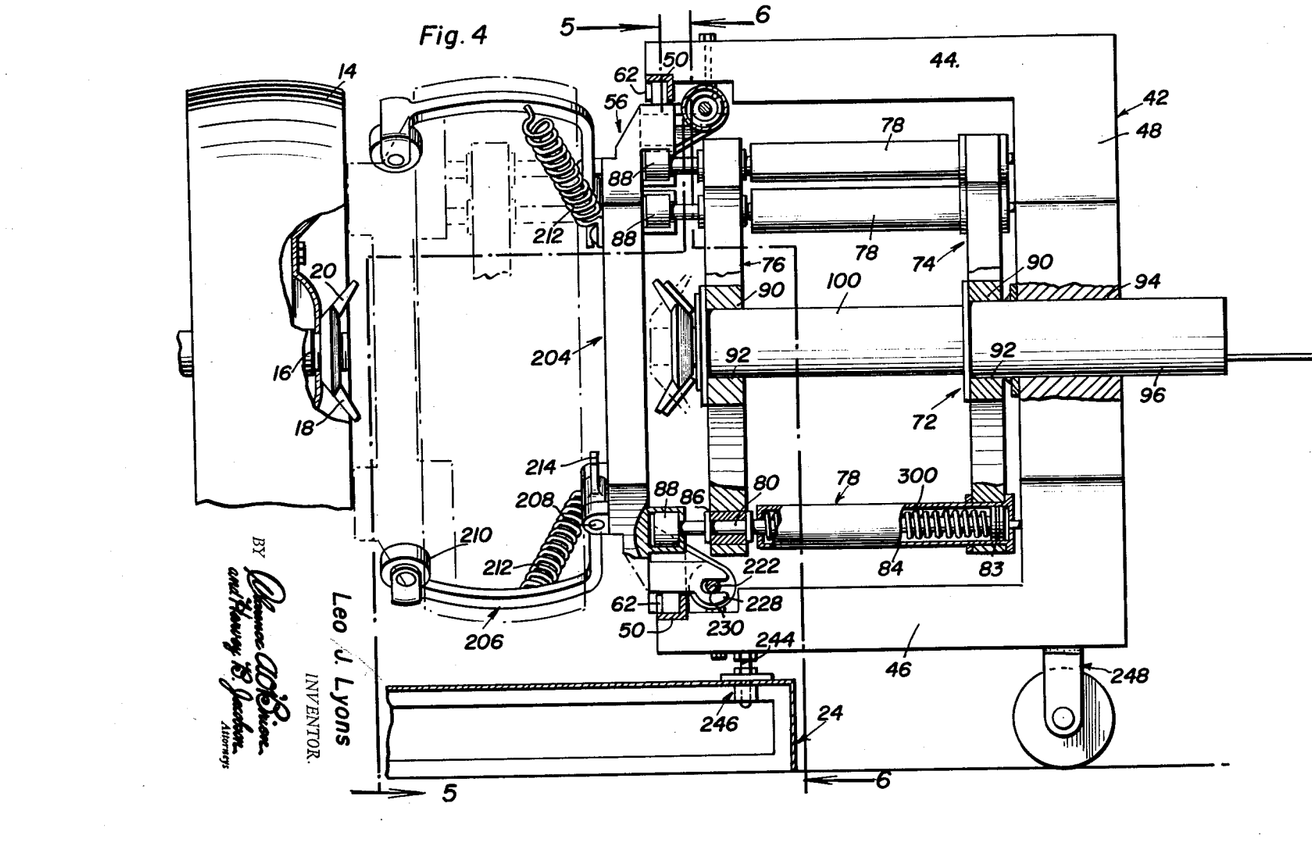
FIGURE 4 is an enlarged transverse vertical sectional view taken substantially upon the plane indicated by the section line 4—4 of FIGURE 3.
Figure 5:
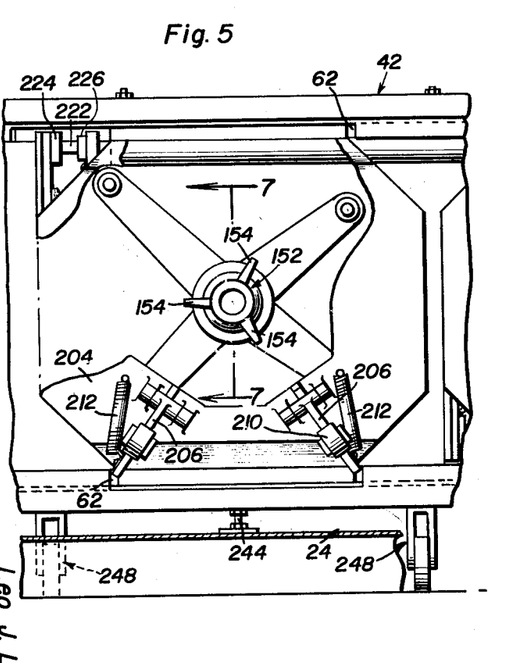
FIGURE 5 is a longitudinal vertical sectional view on somewhat of a reduced scale taken substantially upon the plane indicated by the section line 5—5 of FIGURE 4 and with parts thereof being broken away to more clearly illustrate hidden portions of the invention.
Figure 7:
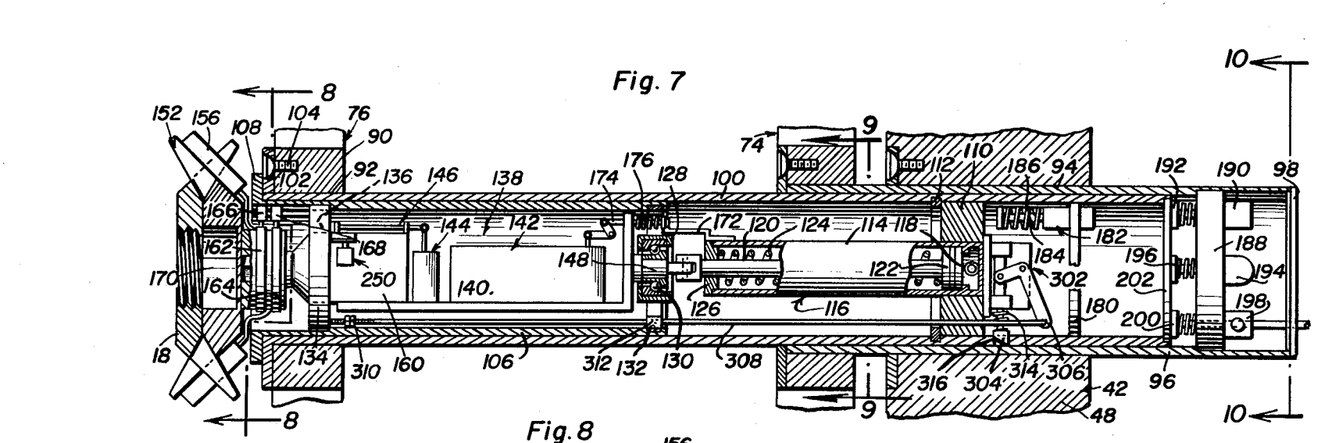
FIGURE 7 is an enlarged transverse fragmentary sectional view taken substantially upon a plane indicated by section line 7—7 of FIGURE 5.
Figure 8:
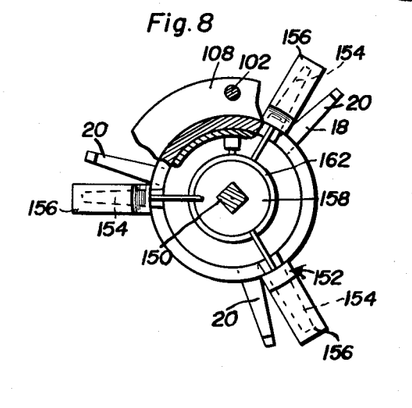
FIGURE 8 is a fragmentary longitudinal vertical sectional view taken substantially upon the plane indicated by the section line 8—8 of FIGURE 7 with parts thereof being broken away and shown in section.
Figure 9:
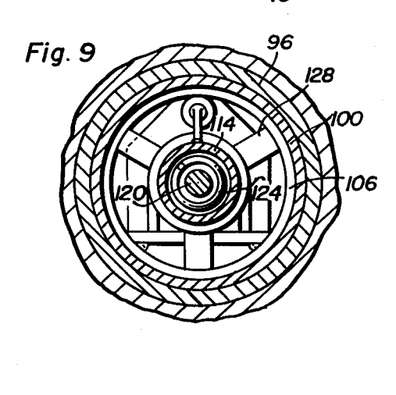
FIGURE 9 is a fragmentary vertical sectional view taken substantially upon a plane indicated by the section line 9—9 of FIGURE 7.

Carried by each main frame 42 is an extending and support means gnerally referred to by the reference numeral 72 and from FIGURES 4, 6 and 7 of the drawings it may be observed that each of the extension and support means 72 comprises a pair of laterally spaced generally X-shaped members referred to in general by the reference numerals 74 and 76 which are interconnected by means of four extensible fluid motors each generally referred to by the reference numeral 78. Each of the X-shaped members 74 and 76 includes a pair of crossed arm members 82 and it will be noted that one end of each of the fluid motors 78 is secured to the corresponding free end of the corresponding arm of the X-shaped members 74. The other ends of the fluid motors 78 each have a piston rod 80 projecting outwardly therefrom which is operatively connected at one end to the corresponding piston 83 within the cylinder 84 and each piston rod 80 is secured to the corresponding end of the arm members of the X-shaped members 76 as at 86 against axial movement relative to that arm member. The free terminal ends of each of the piston rods 80 has a roller 88 journaled thereon which is receivable in the corresponding one of the slots 64, 66, 68 and 70 carried by the corresponding wheel handling member. The hub portion 90 of each X-shaped member 74 and 76 is centrally apertured as at 92 and it may be seen from FIGURES 4 and 7 of the drawings that the bight portion 48 has a bore 94 formed therethrough in which a housing sleeve 96 is secured. The rear or outer end of the sleeve 96 is closed by means of an end wall 98 and a mounting sleeve 100 is telescoped into the open end of the sleeve 96. The mounting sleeve 100 has its forward end secured in the bore 92 formed in the hub portion 90 of the X-shaped member 76 by means of a radially outwardly extending flange 102 which is carried by the mounting sleeve 100 and is secured to the hub portion 90 of the X-shaped member 76 in any convenient manner such as by fasteners 104.

A gun mounting sleeve 106 is telescopically disposed in the open end of the mounting sleeve 100 and is also provided with a radially outwardly projecting annular flange 108 on its forward end for overlying abutting engagement with the flange 102 carried by the mounting sleeve 100. However, the gun mounting sleeve 106 is reciprocal in the mounting sleeve 100 and it will be noted that a mounting block 110 is snugly disposed in the rear end portion of a gun mounting sleeve 106. A stop ring 112 limits forward movement of the mounting block 110 and it will be noted that the free end of a cylinder 114 of a fluid motor 116 is secured in the mounting block 110 and is provided with an inlet opening 118. A piston rod 120 extends from the other end of the cylinder 114 and has a piston 122 mounted on its inner end. A compression spring 124 is disposed about the piston rod 120 and between the confronting faces of the piston 122 and the forward end wall 126 of the fluid motor 116 through which the piston rod 120 projects. The free end of the piston rod 120 is secured to a bearing cage 128 secured in the rear end of the gun mounting sleeve 106. The bearing cage has a bearing assembly 130 mounted therein and it will be noted that the bearing cage 128 is secured in an inwardly opening annular groove 132 formed in the rear end of the gun mounting sleeve 106. A second bearing cage 134 is secured in the forward end of the gun mounting sleeve 106 and a bearing assembly 136 is supported thereby.

Wheel nut removing and replacing means generally designated by the reference numeral 138 and including a mounting bracket 140 on which there is mounted a conventional type of alternator generally designated by the reference numeral 142 such as type D61 manufactured by Square D Co., a double solenoid assembly generally referred to by the reference numeral 144 and an electric impact wrench generally referred to by the reference numeral 146 is supported for rotation about an axis generally paralleling the longitudinal axis of the gun mounting cylinder 106 by means of a stub axle portion 148 carried by the rear of the mounting bracket 140 and the forward end of the impact wrench 146 being rotatably journaled by means of the bearing assembly 136.

The impact wrench 146 is of the reversible type and includes an output shaft 150 on which there is secured a wing nut fixture generally referred to by the reference numeral 152 which includes three radially outwardly projecting arms 154 which each has an electromagnet 156 secured thereto in any convenient manner. An insulator disk 158 is disposed on the output shaft 150 between the wing nut fixture 152 and the motor 160 of the impact wrench 146 and a pair of contact rings 162 and 164 are carried by the insulating disk 158 for engagement by contact points 166 and 168 which are carried by and insulated from the gun mounting sleeve 106 in any convenient manner.

It will be noted that the wing nut fixture 152 includes a centrally disposed forwardly opening recess 170 for the reception of the corresponding spindle portion 16. The wheel nut 18 is engageable by the wheel nut fixture 152 and the arms 154 of the wing nut fixture 158 are forwardly divergent and disposed for engagement with the outwardly divergent wings 20 of the wing nut 18.

An abutment 172 is carried by the cylinder 114 of the fluid motor 116 and is disposed for engagement with the free end of the switch linkage 174 carried by the alternator 142 which is spring urged by means of spring 176 to a normal rearmost position for engagement by the abutment 172.

As previously set forth, the mounting block 110 is snugly disposed within the rear end of the mounting sleeve 100 and is frictionally engaged therewith in order that the mounting block 110 will have a tendency to maintain whatever position it is placed in. A support rib 180 is secured in the rear end of the housing sleeve 100 and a relief valve generally referred to by the reference numeral 182 is mounted on the support rib 108 and includes an actuator 184 normally urged to a forwardmost position by means of compression spring 186 for engagement with the mounting block 110 when it is disposed in its rearmost position.

In addition, the rear end of the housing sleeve 96 has a support bracket 188 secured therein from which there is mounted an actuating valve 190 having an actuator 192, a relief valve 194 having an actuator 196 and a release valve 198 having an actuator 200. Each of the actuators 192, 196 is disposed for engagement by the rear end wall 202 of the mounting sleeve 100 upon movement of the latter to its rearmost position. The actuator 200 is engaged by the end wall 202 at its rearmost position and is secured to the end wall 202 and will move forward with the end wall 202 as the mounting sleeve 100 is moved forwardly.

From FIGURE 4 of the drawings it will be noted that each of the wheel handling members 56 which comprises a generally square open frame generally referred to by the reference numeral 204 is provided with four generally L-shaped arms each generally referred to by the reference numeral 206. Each of the arms 206 has the free end portion of one leg secured to the frame 204 by means of a pivot pin 208 and the free end of each arm 206 is provided with a roller 210. In addition, it will be noted that an expansion spring 212 is secured between the free end portion of each arm 206 and the corresponding open frame 204 and also that each arm 206 includes an abutment portion 214 which is disposed for engagement with the corresponding wheel 14 when the arms 206 are pivoted away from each other at their free ends in the retracted positions. In FIGURE 4 the arms 206 are pivoted to their extended positions for frictionally embracing the corresponding wheel 14 and it is to be noted that when the arms are pivoted to their retracted positions referred to above that they are pivoted approximately 30° from the positions illustrated in FIGURE 4 of the drawings and that the springs 212 will then be disposed in an overcenter position whereby the springs 212 will resiliently urge the arms 206 toward the retracted positions instead of toward the extended positions as illustrated in FIGURE 4 of the drawings.

With attention now directed to FIGURES 1 and 3 through 6 it will be seen that each of the main frames 42 includes a pair of fluid motors generally referred to by the reference numerals 216 and 218. Each of the fluid motors 216 and 218 includes a cylinder portion 220 which is secured to the corresponding main frame 42 and a movable piston rod 222. The free end of each piston rod 222 is provided with a head portion 224 and an annular abutment 226. It will be noted that each head portion 224 abuts against a portion of the corresponding open frame 204 for movement of that frame away from the corresponding cylinder 220 upon extension of the corresponding fluid motor and that each of the abutments 226 is disposed for engagement with a rearwardly projecting slotted arm 228 upon retraction of the corresponding fluid motor. Each of the piston rods 222 is laterally receivable in the corresponding slot 230 formed in the slotted arm 228 carried by the corresponding open frame 204 and it will be noted that upon retraction of the fluid motors 78 that the slotted arms 228 will be moved into engagement with the corresponding piston rods 222. In addition, when the fluid motors 78 are retracted, each rib 58, see FIGURE 14, is aligned with its corresponding channel members 50 and accordingly, it may be seen that upon actuation of the fluid motors 216 and 218 of each main frame 42 that the corresponding wheel handling member 56 which has been retracted by retraction of the fluid motors 78 may be moved longitudinally of the corresponding main frame 42.

Figure 10:
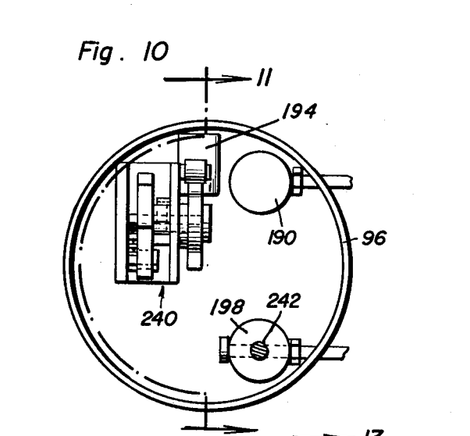
FIGURE 10 is an enlarged sectional view taken substantially upon the plane indicated by the section line 10—10 of FIGURE 7.
Figure 11:
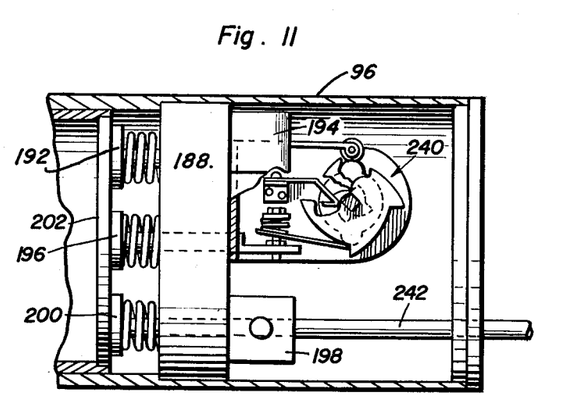
FIGURE 11 is a fragmentary vertical sectional view taken substantially upon the plane indicated by the section line 11—11 of FIGURE 10.
Figure 12:
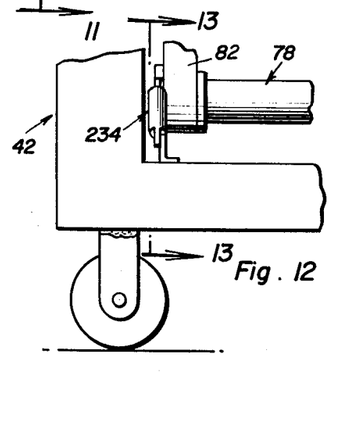
FIGURE 12 is an enlarged fragmentary end elevational view of one of the four main frames of the race car wheel changing machine.

With attention now directed to FIGURES 12 and 13, it will be seen that the arm member 82 of each X-shaped member 74 has one end of an extensible fluid motor generally referred to by the reference numeral 234 pivotally secured thereto as at 236. The other end of each of the fluid motors 234 is pivotally secured to the corresponding main frame 42 as at 238 and it is to be understood that each of the fluid motors 234 as well as the fluid motors 216 and 218 are provided with means in the form of compression springs for normally resiliently urging the fluid motors to retracted positions. With attention now directed to FIGURES 10 and 11 it will be noted that the relief valve 194 includes a cam assembly generally referred to by the reference numeral 240 which enables the relief valve 194 to operate only every second time the mounting sleeve 100 is retracted. In addition, it will be noted that the actuator 200 for the relief valve 198 includes an elongated shank portion 242 whose rear end is provided with an abutment (not shown) for actuating the relief valve 98 upon final movement of the mounting sleeve 100 to the forwardmost extended position.

It may be seen from FIGURE 4 of the drawings that each of the main frames 42 includes at least one depending positioning pin 244 which may be adapted to be snugly received within a socket defining assembly generally referred to by the reference numeral 246 carried by the corresponding side section 32 of the stand 24. The depending positioning pins 244 are carried by the free ends of the arms 46 of the main frames 42 and the rear end of each of the arms 46 includes at least one depending wheel assembly generally referred to by the reference numeral 248. In this manner, each of the main frames 42 may have its forwardmost end lifted out of engagement with the socket defining means 46 in order that the main frames 42 may be moved laterally away from the stand 24.

With attention again directed to FIGURE 7 of the drawings there will be seen a torque responsive switch generally referred to by the reference numeral 250 which is carried by the impact wrench 146 and includes a connection with the gun mounting sleeve 106. The purpose of the torque responsive switch 250 will be hereinafter more fully set forth.

Figures 15, 16:
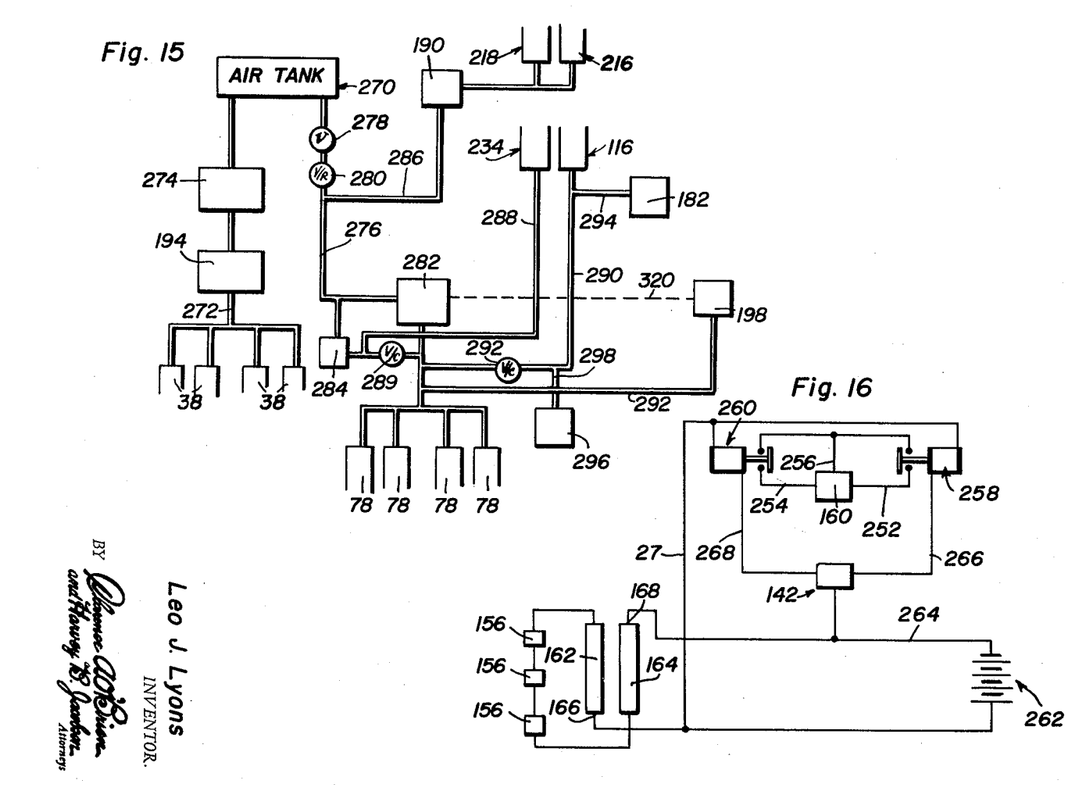
FIGURE 15 is a diagrammatic view of the pneumatic circuit of the wheel changing machine but illustrating the pneumatic circuit of only one of the main frames of the wheel changing machine.
FIGURE 16 is a diagrammatic view of the electrical circuit of the wheel changing machine servicing one wheel of a race car.

With attention now directed to FIGURE 16 of the drawings it will be seen that the motor 160 of the impact wrench 146 is of the reversible type including three leads comprising a forward wire 252 and a reverse wire 254. A ground wire 256 is also provided and it will be noted that a pair of solenoids 258 and 260 are provided for alternately effecting operation of the motor 160 in opposite directions. The alternator 142 is connected to a suitable source of electrical potential 262 by means of wire 264 and the solenoid 258 is connected to the alternator 142 by means of wire 266 while the solenoid 260 is connected to the alternator 142 by means of wire 268. Each of the solenoids 258 and 260 is connected to the ground terminal of the source 262 by means of wire 270 and it is believed that it will be apparent that each time the linkage 174 is actuted by the abutment 172 the alternator 142 will actuate one of the solenoids 258 and 260. It is to be understood that the alternator 142 will alternately actuate the solenoids 258 and 260 and accordingly, each time the abutment 72 is released from engagement with the linkage 174 the alternator will actuate one of the solenoids 258 and 260 to effect operation of the motor 142 in a corresponding direction. Accordingly, each time the gun mounting sleeve 106 is moved outwardly of the open end of the mounting sleeve 100 the motor 160 of the impact wrench 146 will be actuated.

Disposed in series in the wire 264 is the ring 164, the electromagnets 156 and the ring 162. Accordingly, it may be seen that the contacts 166 and 168 electrically connect the magnets 156 to the source of electrical potential 262.

Figure 1:
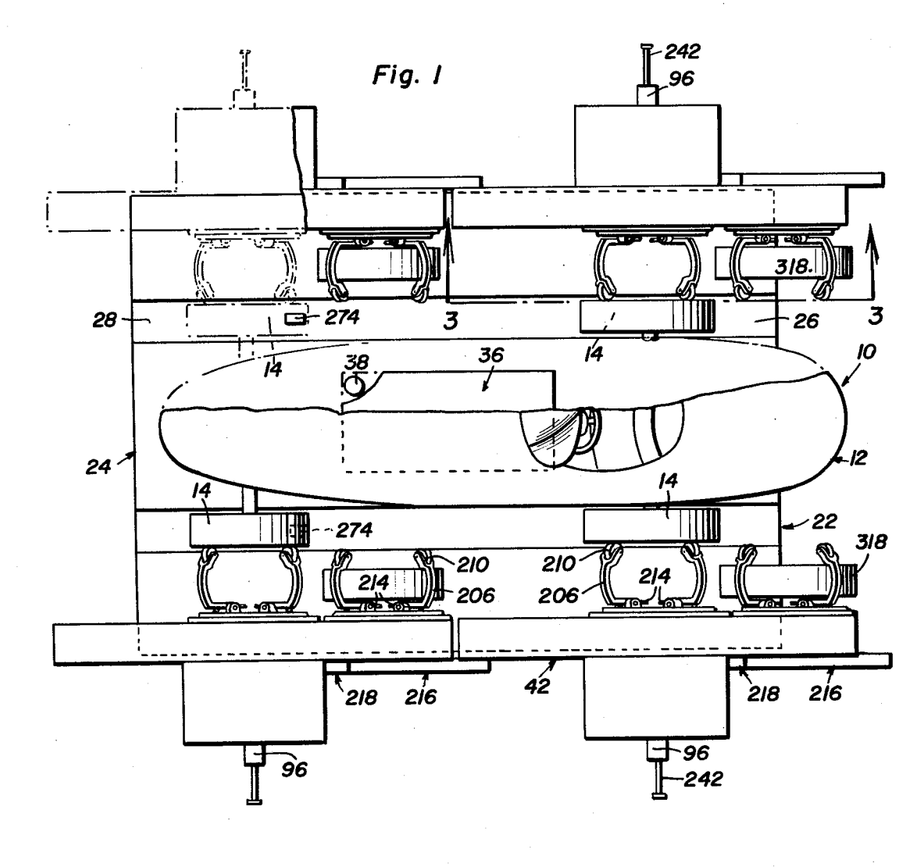
FIGURE 1 is a top plan view of the race car wheel changing machine shown with a race car being positioned on the positioning pad thereof in readiness for being lifted by means of the lift machine of the wheel changing machine.
Figure 2:
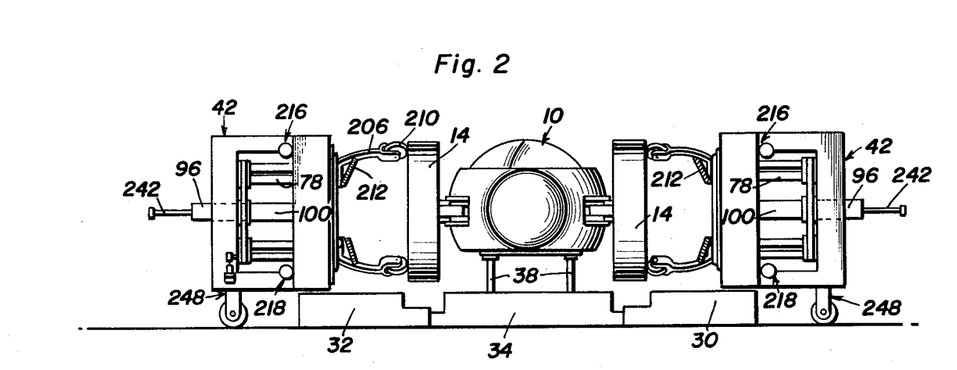
FIGURE 2 is a front elevational view of the embodiment illustrated in FIGURE 1.
Figure 3:
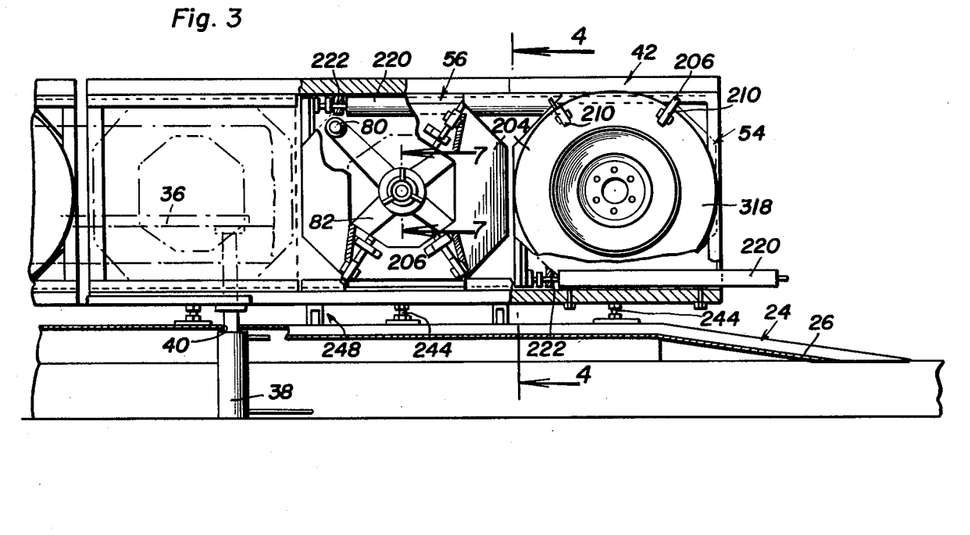
FIGURE 3 is an enlarged vertical longitudinal sectional view taken substantially upon the plane indicated by the section line 3—3 of FIGURE 1.

With reference now to FIGURE 15 of the drawings there will be seen an air tank generally referred to by the reference numeral 270 which is communicated with the fluid motors 38 by means of a conduit 272 in which there is disposed a contact switch 274, see also FIGURE 1, which may be depressed by the front wheels 14 and the race car 10 in order to communicate the air tank with the cylinders 38 to effect operation of the fluid motors 38 in order to jack up the race car 10. It is to be noted that the switch 274 may be of the automatic resetting type and that means is provided (not shown) for closing the switch 274 upon raising of the race car 10 to its uppermost position. Also disposed in the conduit 272 is the relief valve 194 whereupon every second time the mounting sleeve 100 is moved to its rearmost retracted position the fluid motors 38 will be vented in order to lower the race car 10.

The air tank 270 is also communicated with each of the fluid motors 78 by means of conduit 276. The conduit 276 has a control valve 278 and a relief valve 280 also disposed therein and a manually operable valve 282 is also disposed in the conduit 276 and may also be positioned so as to be actuated by the lifting table 36 upon its movement to the uppermost position whereupon actuation of the fluid motor 78 will be automatic upon the raising of the race care 10.

A limit stop valve 284 is also disposed in the conduit 276 and bypasses the valve 282. It will be noted that each of the main frames 42 is provided with one of the limit stop vales 284 so that as the wheel handling members 54 and 56 are moved to the left as viewed in FIGURE 3 by means of the fluid motors 216 and 218 one of the wheel handling members 54 and 56 will engage an actuator (not shown) for the limit stop valve 284 whereby actuating the fluid motor 78.

A conduit 286 communicates the conduit 276 with the actuating valve 190 which is in turn communicated with each of the fluid motors 216 and 218 carried by each main frame 42.

A conduit 288 communicates each of the fluid motors 234 with the portion of conduit 276 immediately downstream of the limit stop valve and upstream of check valve 289 and a conduit 290 communicates each of the fluid motors 116 with the conduit 276. The conduit 290 has a check valve 292 disposed therein and the relief 198 is communicated with the conduit 276 by means of a conduit 292. In addition, relief valve 182 is communicated with the conduit 290 by means of conduit 294 and a relief valve 296 is communicated with the conduit 290 by means of conduit 298. It is to be noted that the relief valve 296 is operatively connected with the torque responsive switch 250 in order that as the impact wrench 146 tightens the corresponding wing nut 18 to a given point, operation of the motor 160 will be terminated and the conduit 290 will be vented thus venting the corresponding fluid motor 116.

It is of course to be understood that each of the fluid motors 78 includes a compression spring 300 for normally urging that fluid motor 78 to a retracted position and with attention again directed to FIGURE 7 of the drawings it will be noted that a latch assembly generally referred to by the reference numeral 302 is mounted on the mounting block 110 in any convenient manner and includes a spring urged latch member 304 which is spring urged to the extended position and is operatively connected to a bell crank 306. The bell crank 306 is pivotally secured to an operating rod 308 and the operating rod 308 is provided with an abutment 310 for seating engagement in the pocket 312 carried by the bearing cage 128. It will be noted that the rod 308 will normally be disposed in its rearmost position by means of a compression spring 314 until such time as the gun mounting cylinder 106 is moved to its forwardmost position thereby enabling the abutment 310 to seat within the pocket 312 and to pull the rod 308 forwardly upon final forward movement of the gun mounting cylinder 106.

In operation, and assuming the wheel handling members 54 and 56 to be in the positions illustrated in FIGURE 1 of the drawings, the race car 10 is driven up onto the stand 24 whereupon the front wheel thereof will roll over the switches 274 thereby enabling air pressure within the air tank 270 to be communicated with the cylinders for fluid motors 38 to effect lifting movement of the lift table 36 whereupon the race car 10 will be jacked up. As the race car 10 is jacked up, the valve 282 is either manually or automatically actuated by means of the lifting table 36 and the fluid motors 78 are thus actuated. The wheel handling members 56 are then extended and the arms 206 thereof snap into position frictionally gripping the corresponding wheel 14. At the same time the fluid motors 78 were actuated, the fluid motors 234 were also actuated. Thus, as the wheel handling members 56 are extended the fluid motors 116 are also urged to the extended position to engage the wheel nut fitting 152 with the corresponding wheel nut 18. In addition, extension of each of the fluid motors 116 will disengage the corresponding abutments 172 from their corresponding linkages 174 whereupon the alternators 142 will be actuated to in turn actuate the motor 160 of the impact wrench 146. As the wheel nut fitting 152 engages the corresponding wheel nut 118, and the fluid motors 116 are moved to their final position upon the snapping engagement of the arms 206 in engagement with the corresponding wheels 14, the rods 308 are pulled whereupon the latch member 304 will be retracted from the notch 316 in which it is normally disposed. Thus, the mounting block 110 will be free to move rearwardly in the mounting sleeve 109. Then, as the confronting faces of the wheel nut fixture 152 and the corresponding wheel 18 abut each other and the wheel nut 18 is backed off, the entire extended unit will be urged toward the retracted position. However, upon movement of the mounting sleeve 100 to its outermost position, the relief valve 198 was actuated in order to vent the fluid motors 78. At this point, the springs 300 in the fluid motors 78 have a tendency to retract the wheel handling members 54 and 56 but the springs 212 connected to the arms 206 are of greater strength and retain the mounting sleeve 100 in the extended position. However, as the wheel nut 18 is backed off, it forces the mounting sleeve 100 rearwardly and into engagement with the actuator 184 of the relief 182 whereupon each of the fluid motors 116 will also be vented. As the compression springs 124 tend to resiliently urge the fluid motors 116 to the retracted position, the combined thrust of the compression spring 124 and the compression springs 300 are sufficient to effect rearward movement of the corresponding X-shaped member 76 and the corresponding mounting sleeve 100. However, as the X-shaped member 76 and the mounting sleeve 100 reach their rearmost position, the fluid motor 116 has not quite been fully retracted whereupon the compression spring 124 will then pull the cylinder 114 of the fluid motor forwardly thus moving the mounting block 110 also forwardly whereupon the released latch member or element 304 will again be registered with the notch or opening 316 enabling the mounting block 110 to again be locked in the foremost position. However, as the mounting sleeve 100 moves to its rearmost position, the actuating valve 190 was actuated by rearward movement of its actuator 192 thereby communicating the fluid motors 216 and 218 with the conduit 276. As the fluid motors 216 and 218 are actuated, the open frames 204 will be moved longitudinally of the corresponding main frame 42 whereupon the new wheel 318 supported by the wheel handling member 54 will be moved into alignment with the corresponding spindle portion 16. As the open frames 204 reach their limit of movement longitudinally of the corresponding main frame 42, the limit switch valves 284 will be actuated thereby again placing the fluid motor 78 in communication with the air tank 270 and actuating the fluid motors 234 whereupon the new wheels 318 are moved into engagement with the spindle portions 116 while being rotated by the cylinders 234. The alternator 142 has of course actuated the motor 160 of the impact wrench 146 to turn in a direction to engage the wing nut 18 with the corresponding spindle portion 16 and to tighten the former on the latter. It is to be understood that the wing nut 18, after first having been removed from the spindle portion 16 was secured to the wing nut fixture 152 by means of the magnets 156. As the impact wrench 46 tightens the wing nut 18, the relief valve 296 is actuated by the torque responsive switch 250 whereupon the fluid motor 116 is vented. As the compression spring 124 in the fluid motor 116 and the compression springs 300 in the fluid motor 78 are sufficient to overcome the tension of the springs 212 carried by the arms 206, the wheel handling member 54 is withdrawn from engagement with the new tire or wheel 318 which has been secured to the race car 10. Upon retraction of the wheel handling members 54, the arms 206 are forced apart at their free ends.

Each time one of the wheel handling members 56 is pulled back to the retracted position, its slotted arm 228 is engaged with the corresponding piston rod 222 between the head portion 224 and abutment 226 carried thereby. It will be noted from FIGURE 15 of the drawings that the check valve 292 will prevent the fluid motor 116 from being vented as the fluid motors 78 are vented by the relief valve 198. In addition, it will be noted that any suitable form of connection between the relief valve 198 and the valve 282 may be provided in order that the relief valve 198 may close the valve 282 upon its actuation. This connection 320 may be of any suitable type.

The control valve 278 is provided in order that the air tank 270 may be manually disconnected from the various fluid motors other than the fluid motors 38 and the relief valve 280 may be actuated to vent all of the fluid motors other than the fluid motors 38 whereby the fluid motors 216 and 218 may be allowed to return the open frames 204 to their original positions after the new wheels 318 have been secured to the spindle portions 16 of the race car 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A race car wheel changing machine including an elongated mounting frame adapted to be positioned to extend alongside an elevated race car and adjacent one wheel thereof, said frame including a pair of wheel handling members, means mounting said members for reciprocal movement along said frame between first and second limit positions, each of said wheel handling members including means for releasably engaging and supporting a wheel, said frame including a release station with which said members are alternately aligned on said limit positions and from which said members may be released from and moved laterally of said frame, extending and support means carried by said frame at said release station with which each of said members is automatically releasably engaged when aligned with said release station, means mounting said extending and support means for reciprocal movement laterally of said frame between extended and retracted positions.

2. The combination of claim 1 wherein said extending and support means includes wheel nut removing and replacing means.

3. The combination of claim 2 wherein said wheel nut removing and replacing means comprises reversible impact wrench means.

4. The combination of claim 3 wherein said reversible impact wrench means includes an output shaft having wheel nut engaging means on its free end provided with magnet means for magnetically gripping a wheel nut.

5. The combination of claim 1 wherein said extending and support means includes wheel nut removing and replacing means, said means mounting said extending and support means for lateral movement of said frame also including means rotatably supporting said mounting and extending means for oscillation about an axis extending laterally of said frame and in the direction of lateral movement of said extending and support means laterally of said frame whereby the wheel carried by said extending and support means may be rotated about its center for registry with positioning studs carried by the corresponding hub on said race car.

6. The combination of claim 1 wherein said means on said wheel handling member for releasably engaging and supporting a wheel comprises a plurality of arms each pivoted to said wheel handling member at one end for swinging movement of its free end between wheel embracing and releasing limit positions.

7. The combination of claim 6 including spring means connected to each of said arms yieldingly urging said arms to said wheel embracing positions.

8. The combination of claim 7 wherein said releasing position comprises an overcenter position whereby said spring means will also urge said arms to said releasing positions.

9. The combination of claim 1 including first motor means for extending and retracting said extending and support means and the wheel handling member aligned and releasably engaged therewith, said first motor means including first control means for actuation of said first motor means to extend said extending and support means in response to movement of one of said wheel handling members to the corresponding limit position longitudinally of said frame.

10. The combination of claim 9 wherein said extending and support means includes wheel nut removing and replacing means, said means mounting said extending and support means for lateral movement of said frame also including means rotatably supporting said mounting and extending means for oscillation about an axis extending laterally of said frame and in the direction of lateral movement of said extending and support means laterally of said frame whereby the wheel carried by said extending and support means may be rotated about its center for registry with positioning studs carried by the corresponding hub on said race car, second motor means for oscillating said extending and support means, said first control means also including means for actuating said second motor means and rotating said extending and support means in one direction.

11. The combination of claim 1 wherein said extending and support means includes wheel nut removing and replacing means, said wheel nut removing and replacing means comprising reversible impact wrench means, means mounting said impact wrench means for reciprocating movement relative to said extending and retracting means along a line generally paralleling movement of said extending and retracting means laterally of and relative to said main frame.

12. The combination of claim 11 wherein said last mentioned mounting means includes motor means for effecting reciprocation of said wrench means relative to said extending and retracting means between extended and retracted limit positions, said last mentioned motor means being operable to effect extension of said wrench means in response to actuation of said first control means.

13. The combination of claim 1 wherein said race car wheel changing machine includes a positioning means having means adapted to properly position a race car relative thereto, lift means for raising and lowering a race car relative to said positioning means, said machine including four of said frames disposed in pairs along opposite sides of said positioning means, means connecting each of said frames to said positioning means in proper position relative thereto so as to be adapted to change all four wheels of a race car positioned by said positioning means.

14. The combination of claim 13 including first motor means for extending and retracting said extending and support means and the wheel handling member aligned and releasably engaged therewith, said first motor means including first control means for actuation of said first motor means to extend said extending and support means in response to movement of one of said wheel handling members to the corresponding limit position longitudinally of said frame, said lift means including motor means having control means to effect lifting of said car in response to the proper positioning of said car relative to said positioning means.

15. The combination of claim 14 wherein said lift means motor means includes control means for lowering said car in response to the second retraction of said extending and support means after the actuation of said lift means to lift said car.

No references cited.